(12) United States Patent
Couelier et al.

(10) Patent No.: US 10,416,868 B2
(45) Date of Patent: Sep. 17, 2019

(54) METHOD AND SYSTEM FOR CHARACTER INSERTION IN A CHARACTER STRING

(71) Applicant: MYSCRIPT, Nantes (FR)

(72) Inventors: Joel Couelier, Nantes (FR); Laetitia Desvages-Cousin, Nantes (FR)

(73) Assignee: MYSCRIPT, Nantes (FR)

( * ) Notice: Subject to any disclaimer, the term of this patent is extended or adjusted under 35 U.S.C. 154(b) by 0 days.

(21) Appl. No.: 15/192,252

(22) Filed: Jun. 24, 2016

(65) Prior Publication Data
US 2017/0249505 A1 Aug. 31, 2017

(30) Foreign Application Priority Data

Feb. 29, 2016 (EP) .................................... 16305229

(51) Int. Cl.
*G06F 3/0485* (2013.01)
*G06F 17/24* (2006.01)
(Continued)

(52) U.S. Cl.
CPC ........ *G06F 3/0485* (2013.01); *G06F 3/04883* (2013.01); *G06F 17/24* (2013.01);
(Continued)

(58) Field of Classification Search
CPC .............................. G06K 9/00416; G06F 17/24
(Continued)

(56) References Cited

U.S. PATENT DOCUMENTS 5,596,350 A * 1/1997 Capps .................. G06F 17/211
345/173
5,698,822 A * 12/1997 Haneda ............... G06F 3/04883
178/18.01
(Continued)

FOREIGN PATENT DOCUMENTS

EP        2 088 536 A1     8/2009
WO     2014/174219 A1    10/2014

OTHER PUBLICATIONS

Shilman, Michael et al. CueTIP: A Mixed-Initiative Interface for Correcting Handwriting Errors. Proceedings for the 19th Annual ACM Symposium on User Interface Software and Technology, Jan. 1, 2006, pp. 323-332.
(Continued)

*Primary Examiner* — Andrew R Dyer
(74) *Attorney, Agent, or Firm* — MH2 Technology Law Group, LLP (57) ABSTRACT

The disclosure relates to a character input method and system, which may include a digital device including a touchscreen that has a recognition area and an insertion area. The method and system may include hardware and/or operations for: scrolling a string of characters that are displayed in the recognition area so as to select a position between a first character and a second character; detecting input strokes that are entered manually in the insertion area; performing handwriting recognition to convert the detected input strokes into recognised characters; inserting, at the position within the string of characters, the recognised characters; and
(Continued)

scrolling the string of characters in the recognition area so as to display, in the recognition area, the recognised characters that were inserted into the string of characters.

12 Claims, 6 Drawing Sheets (51) Int. Cl.
*G06F 3/0488* (2013.01)
*G06K 9/00* (2006.01)

(52) U.S. Cl.
CPC ....... *G06F 17/242* (2013.01); *G06K 9/00402* (2013.01); *G06K 9/00436* (2013.01); *G06F 2203/04808* (2013.01)

(58) Field of Classification Search
USPC ................................ 715/255, 256, 268, 271
See application file for complete search history.

(56) References Cited

U.S. PATENT DOCUMENTS

| | | | | |
|---|---|---|---|---|
| 5,710,832 A * | 1/1998 | Berman | ................ | G06K 9/033 382/187 |
| 5,838,302 A | 11/1998 | Kuriyama et al. | | |
| 6,088,481 A | 7/2000 | Okamoto et al. | | |
| 6,256,009 B1 | 7/2001 | Lui et al. | | |
| 6,341,176 B1 | 1/2002 | Shirasaki et al. | | |
| 6,408,092 B1 | 6/2002 | Sites | | |
| 6,577,296 B2 * | 6/2003 | Flack | .................. | G06F 1/1626 345/157 |
| 6,661,409 B2 | 12/2003 | Demartines et al. | | |
| 7,158,678 B2 * | 1/2007 | Nagel | .................... | G06K 9/222 345/173 |
| 7,174,042 B1 | 2/2007 | Simmons et al. | | |
| 7,193,616 B2 * | 3/2007 | Stavely | ............... | G06F 3/04883 345/173 |
| 7,251,367 B2 | 7/2007 | Zhai | | |
| 7,380,203 B2 | 5/2008 | Keely et al. | | |
| 7,567,239 B2 | 7/2009 | Seni | | |
| 7,571,384 B1 | 8/2009 | Webb | | |
| 7,804,489 B1 * | 9/2010 | Guiter | .................. | G06F 1/1643 178/18.01 |
| 8,094,938 B2 * | 1/2012 | Wang | ..................... | G06K 9/222 345/173 |
| 8,116,569 B2 | 2/2012 | Markiewicz et al. | | |
| 8,276,101 B2 | 9/2012 | Li | | |
| 8,297,979 B2 * | 10/2012 | McIlvain | ................. | G09B 5/02 434/161 |
| 8,352,884 B2 * | 1/2013 | Zalewski | .............. | G06F 1/1626 715/864 |
| 9,170,734 B2 * | 10/2015 | Lee | ...................... | G06F 3/04883 |
| 9,201,592 B2 * | 12/2015 | Akhavan Fomani | ........................ | G06F 3/0237 |
| 9,355,090 B2 * | 5/2016 | Goldsmith | .............. | G06F 3/018 |
| 9,417,790 B2 * | 8/2016 | Na | ........................ | G06F 3/04883 |
| 9,733,716 B2 * | 8/2017 | Shaffer | .................... | G06F 3/017 |
| 9,846,536 B2 * | 12/2017 | Kienzle | .................. | G06F 3/0237 |
| 10,088,977 B2 * | 10/2018 | Kim | ......................... | G06F 9/453 |
| 10,228,839 B2 * | 3/2019 | Files | ...................... | G06F 3/0485 |
| 2003/0007018 A1 * | 1/2003 | Seni | ...................... | G06F 3/0237 715/864 |
| 2003/0016873 A1 * | 1/2003 | Nagel | ..................... | G06K 9/222 382/228 |
| 2003/0038788 A1 | 2/2003 | Demartines et al. | | |
| 2004/0263486 A1 * | 12/2004 | Seni | ...................... | G06F 3/0485 345/173 |
| 2009/0087095 A1 | 4/2009 | Webb | | |
| 2009/0161958 A1 | 6/2009 | Markiewicz et al. | | |
| 2011/0320978 A1 | 12/2011 | Horodezky et al. | | |
| 2012/0032877 A1 * | 2/2012 | Watkins, Jr. | ........... | G06F 1/1624 345/156 |
| 2012/0117506 A1 * | 5/2012 | Koch | ................... | G06F 3/04886 715/773 |
| 2012/0293424 A1 | 11/2012 | Dai et al. | | |
| 2013/0006639 A1 | 1/2013 | Kristensson et al. | | |
| 2013/0120305 A1 | 5/2013 | Yasui | | |
| 2014/0040733 A1 | 2/2014 | Colley | | |
| 2015/0193141 A1 | 7/2015 | Goldsmith et al. | | |
| 2016/0070462 A1 | 3/2016 | Baudry et al. | | |
| 2017/0249293 A1 | 8/2017 | Couelier | | |

OTHER PUBLICATIONS

International Search Report and Written Opinion of the International Searching Authority dated May 8, 2017, International Application No. PCT/EP2017/054404, pp. 1-16.

International Search Report and Written Opinion of the International Searching dated May 8, 2017, International Application No. PCT/EP2017/054401, pp. 1-15.

International Search Report dated Jun. 23, 2014, International Application No. PCT/FR2014/050991, pp. 1-3.

Office Action dated Dec. 13, 2017 in U.S. Appl. No. 14/786,819, 34 pages.

Office Action dated Jun. 12, 2018 in U.S. Appl. No. 15/217,697, 16 pages.

Final Office Action dated Sep. 7, 2018 in U.S. Appl. No. 14/786,819, 34 pages.

* cited by examiner

METHOD AND SYSTEM FOR CHARACTER INSERTION IN A CHARACTER STRING

CROSS REFERENCE TO RELATED APPLICATIONS

This application claims the priority of European Patent Application No. 16 305 229.3 filed on 29 Feb. 2016, the entire disclosure of which is hereby incorporated by reference in its entirety.

TECHNICAL FIELD

The present disclosure relates generally to the field of electronic devices capable of recognizing user input handwriting of various characters, and concerns more particularly a system and corresponding method for inserting one or several characters into a string of characters.

BACKGROUND

Computing devices continue to become more ubiquitous to daily life. They may take various forms such as desktop computers, laptops, tablet PCs, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Each type of computing device is equipped with particular computing resources and designed for particular uses. The variety of computing devices and their subsequent uses necessitates a variety of input devices to allow users to interact with their computing devices.

One such input device is a touch sensitive surface such as a touchscreen or touchpad wherein the user input is received through contact between a user body part (e.g. a finger) or a user-held instrument (e.g. a pen or stylus), and the touch sensitive surface. Another input device is an input surface that senses gestures or motions made by a user above the input surface. A further input device is a position detection system which detects the relative position of either touch or non-touch interactions with a non-touch physical or virtual surface. Any of these methods can be used generally for hand-drawing or for handwriting, such as for inputting text content, such as alphabetic, numeric, grammatical and symbol characters. When user input is drawn or written, the user's handwriting is typically interpreted using a real-time handwriting recognition system or method. To this end, either on-line systems (e.g., recognition carried out using a cloud-based solution or the like) or off-line systems may be used.

Generally, handwriting recognition systems or methods monitor the initiation of a stroke, such as when the user contacts a touch sensitive surface (e.g., pen down); the termination of a stroke, such that when the user stops contacting a touch sensitive surface (e.g., pen up); and any stroke or line that the user makes with his or her finger or instrument between the initiation and termination of a stroke.

The type of computing device can determine the user input interface or method used for inputting characters. As computing devices become smaller, different input interfaces and methods have been developed to allow users to input content in an intuitive and easy manner.

In computing devices where the user draws the input characters, managing the insertion of characters into existing text or the like constitutes a difficult challenge as it generally requires particular gestures with the user's finger or instrument. Conventional text insertion techniques are generally not user-friendly as they require complex or non-intuitive interactions by the user with the interface surface. Too often, the user does not understand, or remember, the insertion technique (if any) implemented by a particular computing device. Some conventional techniques require the user to insert content for editing existing content into a dedicated editing field which is separate from the usual input field, thereby reducing the ergonomics of the input interface and application to devices having smaller interfaces.

A more efficient and user-friendly input method and system is therefore needed to allow insertion of content with respect to existing content when using computing devices such as those mentioned above.

SUMMARY

The present disclosure provides a character input method performed by a digital device comprising a touchscreen, the touchscreen comprising a recognition area and an insertion area, the method comprising:
  a first scrolling for scrolling a string of characters displayed at least in the recognition area so as to select a position between a first character and a second character consecutive to the first character within the string of characters;
  detecting at least one input stroke entered manually in the insertion area;
  performing handwriting recognition to convert the at least one detected input stroke into at least one recognised character;
  inserting, at the position within the string of characters, the at least one recognised character; and
  a second scrolling for scrolling the string of characters in the recognition area so as to display, in the recognition area, at least part of the at least one recognised character inserted into the string of characters.

The present disclosure allows efficient and user-friendly insertion, by a user, of characters into a string of characters at an appropriate position therein. The disclosure permits input of additional characters in a natural and quick manner. In particular, easy selection of the position at which insertion is to be carried out can be achieved thanks to the present teachings. The user does not need to perform complex gestures and may easily remember the procedure for performing character insertion according to the present disclosure. The user may insert additional characters directly in the input area destined for handwriting input. In particular, the disclosure obviates the need for inserting additional characters using a text field separate from the input area of the digital device.

According to a particular embodiment, the recognition area and the insertion area are adjacent to each other. This particular arrangement facilitates a natural input by the user of additional characters into a string of characters.

According to a particular embodiment, in the first scrolling, an insertion marker displayed on the touchscreen defines the position within the string of characters. Display of an insertion marker facilitates selection by the user of the position within the string of characters at which character insertion is to be carried out.

According to a particular embodiment, the insertion marker is statically positioned at a boundary between the recognition area and the insertion area during the first scrolling. This particular arrangement allows easy selection by the user of the appropriate position within the string of characters by simply scrolling the string of characters in the input area.

According to a particular embodiment, the first scrolling is performed in a first direction such that each character of the string of characters displayed in the recognition area moves within the recognition area until entering into the insertion area.

According to a particular embodiment, the string of characters comprises a plurality of words of at least one character, the method comprising:

during the first scrolling, displaying each word positioned in the recognition area while masking at least partially each word entering entirely from the recognition area into the insertion area.

This particular arrangement allows the user to easily, precisely, and accurately identity the position within the string of characters where characters are to be inserted. In addition, room may be accommodated in the insertion area to enable the user to directly input strokes in the input area.

According to a particular embodiment, the string of characters comprises a plurality of words of at least one character, wherein, in the first scrolling, the selected position within the string of characters is a position immediately following the last word of the string displayed at least partially in the recognition area. This particular arrangement allows easy selection by the user of the position within the string of characters at which character insertion is to be carried out.

According to a particular embodiment, in the second scrolling, the string of characters is scrolled in a direction from the insertion area to the recognition area so as to display, in the recognition area, at least part of the at least one recognised character inserted into the string of characters.

According to a particular embodiment, the second scrolling is performed automatically after the detecting of the at least one input stroke.

According to a particular embodiment, the second scrolling is triggered automatically upon detection that the handwriting recognition is completed. In this manner, efficient and natural input of additional characters within a string of characters can be achieved.

According to a particular embodiment, the method comprises displaying, in the insertion area, the detected at least one input stroke while the handwriting recognition is being performed. This particular arrangement allows temporary display of handwritten characters in the insert area.

According to a particular embodiment, the second scrolling comprises:

inserting, at the position within the string of characters, the detected at least one input stroke; and scrolling the string of characters in the recognition area so as to display, while the handwriting recognition is being performed, at least part of the inserted at least one input stroke in the recognition area.

This particular arrangement enables the user to insert in a continuous and natural manner additional characters in the string of characters.

According to a particular embodiment, the second scrolling comprises:

replacing the inserted at least one input stroke being displayed in the recognition area with the at least one recognised character once the handwriting recognition is completed.

According to a particular embodiment, in the second scrolling, the at least one inserted character is displayed as typeset text in the recognition area.

According to a particular embodiment, the method comprises, after the second scrolling, a third scrolling in a same direction as the second scrolling to cause display, in the recognition area, of at least the second character immediately following the inserted at least one character within the string of characters. In this manner, the user may scroll and visualize the entire string of characters in which additional characters have been inserted.

In a particular embodiment of the disclosure, the various steps of the character input method are specified by computer program instructions.

Accordingly, the disclosure also provides a computer program on a recording medium, this computer program being arranged to be implemented by a digital device, and more generally by a processor, this computer program comprising instructions adapted for the implementation of a character input method as defined above.

In particular, the present disclosure provides a non-transitory computer readable medium having a computer readable program code embodied therein, the computer readable program code being adapted to be executed to implement a character input method in a digital device comprising a touchscreen, the touchscreen comprising a recognition area and an insertion area, the method comprising:

a first scrolling for scrolling a string of characters displayed at least in the recognition area so as to select a position between a first character and a second character consecutive to the first character within the string of characters;

detecting at least one input stroke entered manually in the insertion area;

performing handwriting recognition to convert the at least one detected input stroke into at least one recognised character;

inserting, at the position within the string of characters, the at least one recognised character; and a second scrolling for scrolling the string of characters in the recognition area so as to display, in the recognition area, at least part of the at least one recognised character inserted into the string of characters.

The computer programs (or computer program products) of the disclosure can be expressed in any programming language, and can be in the form of source code, object code, or any intermediary code between source code and object code, such that in a partially-compiled form, for instance, or in any other appropriate form.

The disclosure also provides a computer readable program code as mentioned above.

The non-transitory computer readable medium previously mentioned can be any entity or device capable of storing the computer program. For example, the recording medium can comprise a storing means, such as a ROM memory (a CD-ROM or a ROM implemented in a microelectronic circuit), or a magnetic storing means such as a floppy disk or a hard disk for instance.

The non-transitory computer readable medium of the disclosure can correspond to a transmittable medium, such as an electrical or an optical signal, which can be conveyed via an electric or an optic cable, or by radio or any other appropriate means. The computer program according to the disclosure can in particular be downloaded from the Internet or a network of the like.

Alternatively, the non-transitory computer readable medium can correspond to an integrated circuit in which a computer program is loaded, the circuit being adapted to execute or to be used in the execution of the methods of the invention.

The present disclosure also concerns a system for providing input of characters to a digital device, the digital device comprising a processor, a touchscreen comprising a recognition area and an insertion area for accepting character input, and at least one non-transitory computer readable medium, the at least one non-transitory computer readable medium configured to, under control of the processor:
- a scrolling module for scrolling, as a first scrolling, a string of characters displayed at least in the recognition area so as to select a position between a first character and a second character consecutive to the first character within the string of characters;
- a detection module for detecting at least one input stroke entered manually in the insertion area;
- a recognition module for performing handwriting recognition to convert the at east one detected input stroke into at least one recognised character; and
- an insertion module for inserting, at the position within the string of characters, the at least one recognised character,
- wherein the scrolling module is configured to scroll, as a second scrolling, the string of characters in the recognition area so as to display, in the recognition area, at least part of the at least one recognised character inserted into the string of characters.

The disclosure also provides a digital device comprising: a touchscreen comprising a recognition area and an insertion area; and a scrolling module, detection module, recognition module and insertion module as mentioned above.

The various embodiments defined above in connection with the character input method of the present disclosure apply in an analogous manner to the non-transitory computer readable medium, to the system and to the digital device of the present disclosure.

BRIEF DESCRIPTION OF THE DRAWINGS

Other characteristics and advantages of the present disclosure will appear from the following description made with reference to the accompanying drawings which show embodiments having no limiting effect. In the figures.

The components in the figures are not necessarily to scale, emphasis instead being placed upon illustrating the principles of the present disclosure.

For simplicity and clarity of illustration, the same reference numerals will be used throughout the figures to refer to the same or analogous parts, unless indicated otherwise.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, and/or components are described at a relatively high-level, without detail, in order to avoid unnecessarily obscuring aspects of the present teachings.

The following description of the exemplary embodiments refers to the accompanying drawings. The following detailed description does not limit the invention. Instead, the scope of the invention is defined by the appended claims. In various embodiments as illustrated in the figures, a digital device, a character input method and a corresponding computer program on a computer-readable medium are discussed.

As indicated earlier, the present disclosure relates generally to the field of electronic devices capable of recognizing user input handwriting of various characters, and concerns more particularly a digital device and corresponding method for inserting one or several characters into a string of characters. The disclosed digital device and method are based on computer technology to overcome problems specifically arising in user interfaces, including the problem of how to accurately and precisely insert hand-written characters into existing text that is displayed on the user interface of a digital device. Thus, the disclosed digital device and method improve the ability of a computer to display character information and interact with the user.

In the present document, a "character" should be understood broadly as referring to any kind of character, symbol or the like, including two or more characters. A character may be, for instance, an alphanumeric character, a letter, a number, a word, a grammatical mark, a sign or any combination thereof, although other types of characters may be contemplated.

Figure 1:
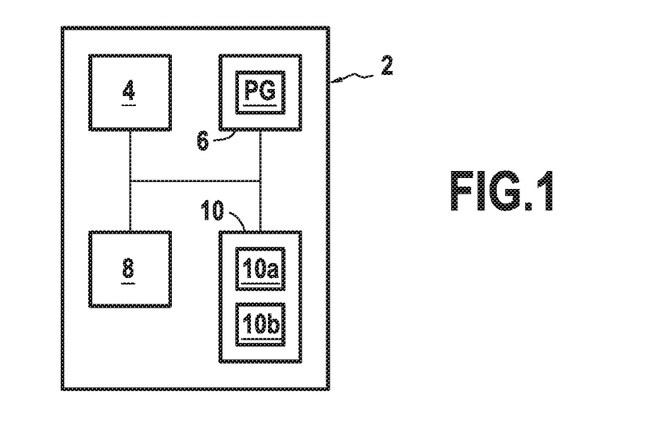
FIG. 1 is diagram of a digital device according to a particular embodiment of the disclosure.
Figure 2:
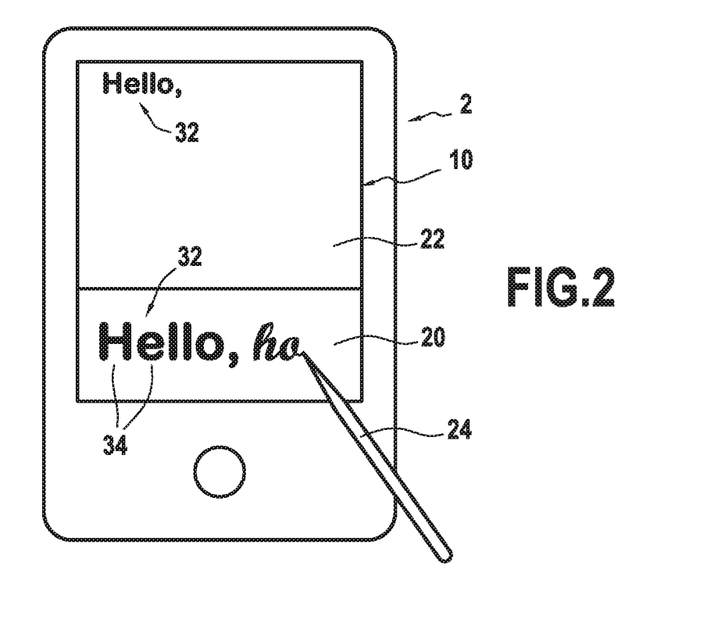
FIG. 2 depicts the digital device of FIG. 1, according to a particular embodiment.

FIGS. 1 and 2 show in a schematic manner a computing or digital device 2 according to a particular embodiment of the disclosure. The device 2 described in this example is a smartphone comprising a touchscreen 10. The user may interact with the touchscreen 10 using his/her finger or a stylus 24 to input characters 34 using handwriting.

It can be understood that the device 2 may be in the form of any appliance (portable or otherwise) comprising a touch sensitive surface and suitable for implementing the character input method according to the present disclosure (e.g., desktop PC, tablet PC, personal digital assistants, etc.).

As depicted in FIG. 1, the device 2 has a processor 4, a rewritable non-volatile memory 6 (e.g., a flash memory or the like), a RAM memory 8 and an input-output interface 10 allowing input and display of characters. The input-output interface 10 may have a display 10a for displaying characters and an input (touch sensitive surface) 10b for inputting characters on the display 10a. In the present embodiment, the input-output interface 10 is a touchscreen. Other embodiments may be contemplated wherein the display 10a and the input 10b (e.g., the touch sensitive surface) are separate components of the device 2 or of separate, connected devices, or another input surface is utilized such as a proximity sensitive surface configured to detect a body part (e.g., a finger) or an instrument (e.g., a stylus) near the proximity sensitive surface or a projected surface formed using a projector for projecting an array of virtual 'keys' (or the like) on any suitable surface such as a table or a white board so that a user can interact with the projected array of keys.

The non-volatile memory 6 of the device 2 constitutes a computer usable medium (or recording medium) in accordance with a particular embodiment of the disclosure. The memory 6 includes a computer program (or computer-readable program code or the like) PG according to a particular embodiment of the disclosure, this computer program having processor-executable instructions to implement a method or operations according to a particular embodiment of the invention.

The computer program PG may include instructions for recognising handwriting input to the device 2 or the device 2 may be connected to a remote system for recognising input handwriting. The handwriting recognition processing utilizable by the present system and method may take the form of known handwriting recognition methods or specific methods such as using a neural network as described, for example, in PCT Patent Application Publication No. WO 2014/174219, International Appl. No. PCT/FR2014/050991, filed on 24 Apr. 2014, in the name of the present Applicant and Assignee, the entire contents of which is incorporated by reference herein.

As depicted in FIG. 2, the touchscreen 10 of the device 2 has a first area 22 (which is a content display field or zone in this example) and a second area 20 (which is a content input field or zone). The input area 20 is interactive, and as such a user may input the characters 34 in the input area 20, thereby forming a string 32 of characters, using for instance the stylus 24. In the present example, the string 32 of characters 34 forms text having a plurality of words with a grammatical mark, being a comma in this example. As can be seen, in the present example, the input area is configured to allow several characters or words of text to be displayed at once. Upon receipt of input using the present system and method, the handwritten input is rendered in a well understood manner as so-called 'digital ink' (e.g., as ink objects that display the handwriting in its form as input, capturing the movement of the stylus 24) in the input area 20. The digital ink represents the strokes input by the user, and the handwritten strokes are processed to recognise the content—e.g., to recognize specific characters. The output recognition results are rendered in a well understood manner as so-called 'typeset ink' (e.g., as digital objects displayed as typeset font text) which replaces the previous digital ink versions of the recognised content.

For example, as shown in FIG. 2, in the character string 32 displayed in the input area 20 the handwritten input forming the word "Hello" and the comma "," has been recognition processed and the recognition results displayed as the typeset ink version of the characters 34. However the handwritten input forming the characters "ho" has yet to be recognition processed as the pen-up event is yet to occur, for example, and so the input characters 36 are rendered as digital ink. Although it is useful to display the recognised content to the user in the input area 20, as this provides handwriting recognition feedback during input, the present system and method may display the input in digital ink only, or provide users with the ability to select the display of digital or typeset ink through gesture input or a menu display, for example.

In the present embodiment, the content display field 22 is also provided on the touchscreen 10, such that the content display field 22 is interactive. The content display field 22 is configured to display, e.g., in a larger area than the input area 20 using for instance smaller text font, a representation of the character string 32 input by the user in the input area 20.

In the present example, the content display area 22 is configured to allow several lines of text to be displayed at once with suitable reflow of words and sentences, for example. In this way, users are provided with display of their input content despite the constrained configuration or size of the input area 20. Alternatively, the content display area 22 may provide display of a single line of content in smaller font that the input area 20 for example and provide a scrolling display of that content as more content is input or through user interaction therewith, such as with gestures. The text in the content display field 22 is generally rendered in a well understood manner as digital objects, e.g., in typeset ink, as recognised by the present system and method from the handwritten input 34.

For example, in FIG. 2 in the character string 32 displayed in the content display area 22 the recognised content forming the word "Hello" and the comma "," is displayed as the typeset ink version of the characters 34, as displayed in the input area 20, however the handwritten input forming the characters "ho" in the input area 20 has yet to be recognition processed and so the corresponding characters are not yet displayed in the content display area 22. Although it is useful to display the recognised content to the user in the content display area 22 as this provides context for continued input, the digital device according to the present disclosure may be implemented without inclusion of such a (recognised) content display or the present system and method may provide users with the ability to select whether or not to the display of the content display area 22 in addition to the input area 20. Further, the present system and method may display the content in the content display area 22 as digital ink instead, or provide users with the ability to select the display of digital or typeset ink, for example, through gesture input or menu display.

According to a particular embodiment, the device 2 may operate according to an insertion mode to allow the user to insert at least one new character within a string of characters. The insertion mode may for instance be a functionality implemented by the device 2 in response to receipt of a pre-defined command. In some implementations, the pre-defined command may be a multi-position interaction; that is, input of a gesture such as a multi-finger press or a swipe (discussed in detail later). For example, a user may use the device 2 in a normal input mode to handwrite characters in the input area 20 and switch the device 2 to the insertion mode by gesturing on the touchscreen 10 in order to edit the previously input characters by inserting therein at least one additional character.

Figure 3:
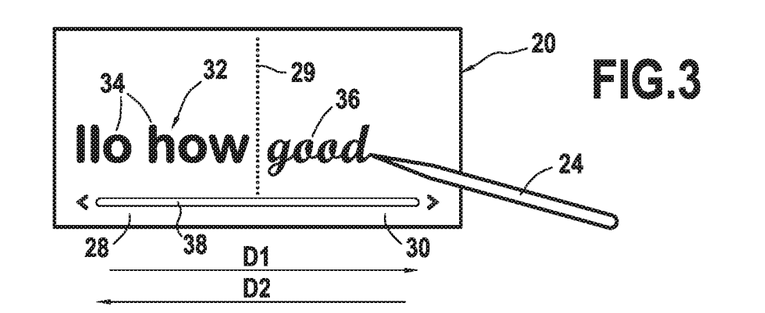
FIG. 3 depicts an input area of a user interface of a digital device, according to a particular embodiment.

FIG. 3 illustrates the input area 20 during operation of the device 2 in the insertion mode, according to a particular embodiment. As shown in FIG. 3, the input area 20 is configured with a recognition area 28 and an insertion area 30. As will be described in more detail further below, providing the user with the insertion area 30 in addition to the recognition area 28 permits easy and efficient insertion of new characters into an existing string of characters.

The recognition area 28 is configured to display the part of the character string 32 which generally corresponds to the recognized content of previous input, as discussed earlier and as shown in FIG. 3. The insertion area 30 is configured as a portion of the input area 20 in which at least one new stroke 36 input by a user in handwriting is detected by the device 2 and rendered as digital ink. Once handwriting recognition has been performed on the newly input stroke(s) 36 and/or when the insertion mode ceases, (which returns the device 2 to input mode), the recognition area 28 displays the character string 32 with at least one character recognised from the detected input stroke 36 inserted and the digital ink version in the insertion area 30 is omitted from display (e.g., the digital ink version from the insertion area 30 disappears).

In various implementations, the insertion marker 29 is displayed and may be configured to define any desired position within the string 32 of characters 34 at which at least one character is to be inserted, where the inserted character is recognised from or based on the detected input stroke(s) 36. The user may thus use the insertion marker 29 to select a particular position within the string 32 of characters 34 for the purpose of inserting new characters therein.

In the particular example shown in FIG. 3, the insertion marker 29 is positioned at the boundary between the recognition area 28 and the insertion area 30, however other positioning is possible. The insertion marker 29 may take any suitable form allowing the user to select, e.g., by scrolling in the input area 20, a position within the string 32 of characters 34 at which at least one character is to be inserted. In FIG. 3, the insertion marker is represented by a dashed line, however other display renderings of the marker are possible. The insertion marker 29 may for instance be an indicator displayed on the input area 20, such as a line, cursor, arrow or the like. In another embodiment, selection of the insertion position may be made without displaying an insertion marker 29.

In the particular example shown in FIG. 3, the insertion marker 29 defines a position in the string 32 of characters 34 immediately succeeding the word "how" as the insertion position at which one new character is to be inserted. In this example, the characters to be inserted form the word "good", this word being recognized based on a handwriting recognition performed on the input of the single stroke 36 detected as being input in the insertion area 30.

As shown in FIG. 3, an interactive scrolling actuator 38 (taking for instance the form of a scrollbar, as in FIG. 3, scrolling buttons or the like) may be provided, for instance in or in the vicinity of the input area 20, to allow scrolling of the string 32 of characters 34 in the input area 20 in a first direction D1 (to the right in this example) and in a second opposite direction D2 (to the left in this example) through user gesture, such as a swipe gesture, for example. Other methods for commanding scrolling in the input area 20 are possible.

It should be understood that the particular disposition (form, layout, etc.) of the overall user interface of input area 20, including the recognition area 28, insertion area 30, scrolling actuator 38 and insertion marker 29, as depicted in FIG. 3, constitutes a mere example and should not be construed as limiting in any way the scope of the present disclosure.

In a particular example, the recognition area 28 and the insertion area 30 are adjacent one other. Other dispositions are however possible according to the present disclosure. In particular, the relative disposition of the recognition area 28 and the insertion area 30 may be adapted to the intended use, such as the form factor of the computing device, and the type and/or format of the language when the device 2 is be used for displaying and editing text or the like. Arrangement of the user interface may for instance be adapted to allow easy and efficient interaction with a user depending on whether characters are input in English, Japanese, Chinese, or some other character set.

Figure 4:
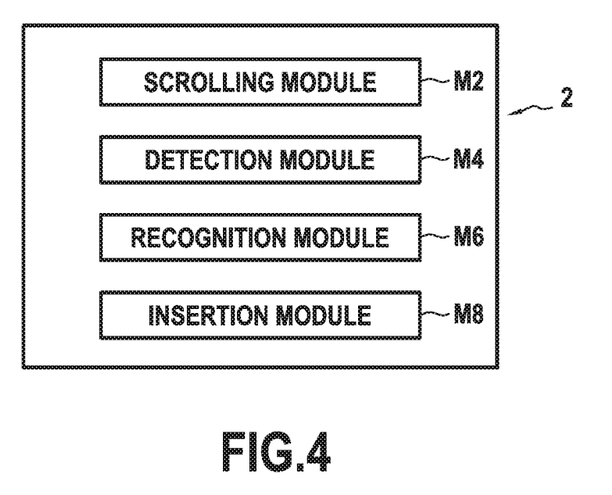
FIG. 4 is a block diagram showing modules implemented by the digital device of FIG. 1, according to a particular embodiment.

In the present embodiment, when running the computer program PG stored in the memory 6, the processor 4 implements a number of processing modules depicted in FIG. 4, that is: a scrolling module (or display control module) M2, a detection module M4, a recognition module M6 and an insertion module M8. It should be understood that these particular processing modules M2 to M8 constitute a mere illustrative example of implementation of the present disclosure. Various implementations of processing modules may for instance be contemplated by a person skilled in the art to implement an input method in accordance with the present disclosure.

More particularly, the scrolling module M2 is operable to scroll the string 32 of characters 34 in the input area 20 so as to select a particular position within the string 32 where at least one character is to be inserted. In the present embodiment, scrolling may be performed in two opposite directions D1 and D2 as illustrated by the arrows shown in FIG. 3. Scrolling may be performed either automatically by the scrolling module M2 under control of the processor 4, for example, or in response to a scrolling command received from the user, e.g., through interaction with the scrolling actuator 38 or by any other suitable interaction.

The detection module M4 is operable to detect at least one input stroke 36 in the insertion area 30.

The recognition module M6 is operable to perform, or cause to be performed, handwriting recognition based on the detected input stroke(s) 36 so as to produce at least one recognised character.

The insertion module M8 is operable to insert, at the particular position previously selected within the string 32, at least one character recognised by the recognition module M6 based on the detected input stroke(s) 36.

In a particular embodiment:

the scrolling module M2 is for scrolling, as a first scrolling, a string of characters displayed at least in the recognition area 28 so as to select a position between a first character and a second character consecutive to the first character within the string of characters;

the detection module M4 is for detecting at least one input stroke 36 entered manually (e.g., entered by a user writing with their finger, a stylus, or the like) in the insertion area 30;

the recognition module M6 is for performing handwriting recognition to convert the at least one detected input stroke 36 into at least one recognised character; and the insertion module M8 is for inserting, at the position within the string of characters, the at least one recognised character, wherein the scrolling module is configured to scroll, as a second scrolling, the string 32 of characters in the recognition area 28 so as to display, in the recognition area 28, at least part of the at least one recognised character as inserted into the string 32 of characters.

In a particular embodiment, the disclosure can be implemented using software and/or hardware components. In this context, the term "module" can refer in this document to a software component, as well as a hardware component or a plurality or combination of software and/or hardware components.

A character input method implemented by the device 2 illustrated in FIGS. 1 to 4 is now described with reference to FIG. 5, in accordance with a particular embodiment of the present disclosure. More specifically, the device 2 implements this method by executing computer program PG stored in the memory 6. The character input method of this particular embodiment comprises:

a first scrolling (S2) for scrolling a string 32 of characters 34 displayed at least in the recognition area 28 so as to select a position between a first character and a second character consecutive to the first character within the string 32 of characters 34;

detecting (S4) at least one input stroke 36 entered manually in the insertion area 30;

performing (56) handwriting recognition to convert the at least one detected input stroke 36 into at least one recognised character;

inserting (S8), at the selected position within the string 32 of characters 34, the at least one recognised character; and a second scrolling (S10) for scrolling the string 32 of characters 34 in the recognition area 28 so as to display, in the recognition area 28, at least part of the at least one recognised character that was inserted into the string 32 of characters 34.

Figure 5:
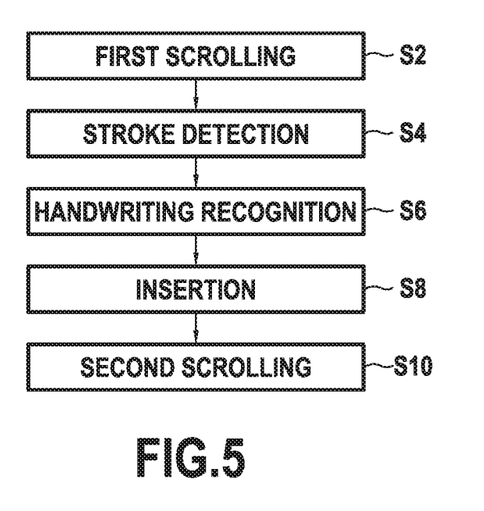
FIG. 5 is a flow chart showing a character input method according to a particular embodiment of the present disclosure.

Referring to FIGS. 3-5, the first scrolling S2 is performed by the scrolling module M2 in the first direction D1 so that the position to be selected moves gradually from right to left through characters of the string 32. In a particular embodiment, the insertion marker 29 may define in real-time the position to be selected while the first scrolling is in progress.

On the other hand, the second scrolling S10 is performed by the scrolling module M2 in the second direction D2, in this example. This second scrolling allows, among other things, accommodating spare room in the recognition area 28 for the purpose of displaying the one or more characters (or at least a part thereof) that are recognised by the recognition module M6 and inserted by the insertion module M8 into the string 32 of characters 34.

A character input method as illustrated in FIG. 5 is now described in more detail in a particular embodiment with reference to FIGS. 6 and 7A-7F. More specifically, the device 2 implements this method by executing the computer program PG stored in the memory 6 in this example.

It is assumed in this example that the device 2 allows input and editing of text characters, although other types of characters may be contemplated.

As an initial state, it is assumed in this example that a user has previously inputted into the device 2 the following string 32 of characters 34:

"Hello how are you?"

Figure 7A:
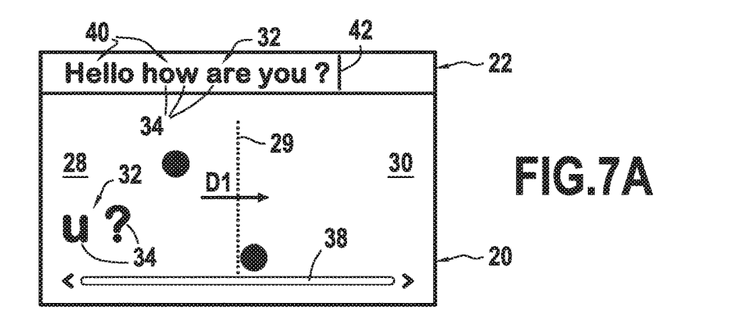
FIG. 7A illustrates a user interface of a computing device, including a content display area that receives user input, according to a particular embodiment of the present disclosure.

The string 32 is made of words 40 and the grammatical mark "?", each word being made up of at least one character 34, as illustrated in the content display area 22 in FIG. 7A, for example.

In the present example, the user may for instance have inputted the above string 32 (or sentence) by contacting the input area 20 with his/her finger, the stylus 24 or the like. To this end, the device 2 may for instance operate in a normal input mode allowing the user to input characters in the input area 20 using any user interface appropriate for inputting characters such as text. For instance, in the normal input mode, the input area 20 does not have an insertion area 30, thereby allowing a larger recognition area 28 to be displayed for easier and more accurate character input by the user.

In a variant, the string 32 of characters 34 has been previously entered into the device 2 by any appropriate method or means. The string 32 may have been previously stored in the device 2, by the memory 6 for example. In another example, the device 2 may be configured to receive, by any appropriate transmission technique, the string 32 "Hello how are you?" from another terminal or device.

Still further, it is assumed that the device 2 now operates in an insertion mode allowing insertion of one or more characters into the string 32 of characters 34 at a selected position, in accordance with a particular embodiment.

As shown in FIG. 7A, in an initial state, the string 32 is displayed in the content display area 22 in a format which allows easy visualisation, viewing, or reading by the user. A cursor 42 appearing in the content display area 22 may indicate a current active position within the string 32 of characters 34.

Figure 6:
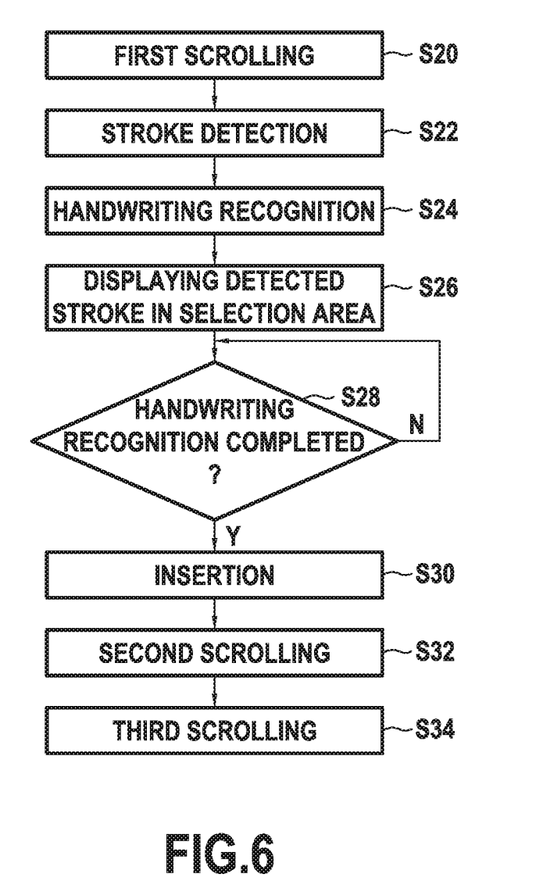
FIG. 6 shows a character input method according to a particular embodiment of the present disclosure.

In S20 of FIG. 6, a first scrolling is performed, for example by the scrolling module M2, for scrolling the string 32 of characters 34 in the recognition area 28. In the present example, the first scrolling S20 is performed in the first direction D1 in response to a scrolling command received from the user. To do so, the user may for instance use a multi-position interaction with the user interface, such as touching two fingers as represented in FIG. 7A by the two dots in the vicinity of the arrow pointing in the direction D1. During the first scrolling S20, the user may thus scroll backward through the string 32 of characters 34 to search for a specific position within the string 32 where at least one character is to be inserted.

FIG. 7A depicts a first state of the input area 20 during the first scrolling S20 where only the end of the string 32 (i.e., the characters "u?") is displayed in the recognition area 28.

As explained in more detail below, the insertion marker 29 may be used to define a position within the string 32 of characters at which the user wishes to insert one or more characters. The current active position indicated by the cursor 42 in the content field 22 may correspond to the position of the insertion marker 29 relative to the string 32 of characters 34 in the input area 20. Other embodiments without implementing such an insertion marker may also be contemplated.

Figure 7B:
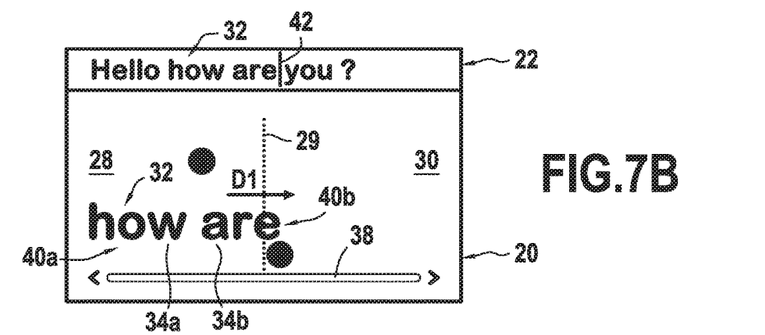
FIG. 7B illustrates another example of the user interface of a computing device, including a content display area that receives user input, according to a particular embodiment of the present disclosure.

FIG. 7B depicts a second state of the input area 20 while the first scrolling S20 is still in progress, where the string 32 has further been scrolled in the direction D1. As can be seen, the last characters "you?" of the string 32 displayed in the recognition area 28 have been moved along direction D1 through the recognition area 28 until disappearing upon entering the insertion area 30.

In the present example, the string 32 comprises a plurality of words 40, each of at least one character 34 (the words "how" and "are" are noted respectively 40A and 40*b*). The scrolling module M2 is configured, in the first scrolling S20, to display each word 40 which is positioned in the recognition area 28 while masking each word 40 that has exited entirely from the recognition area 28 into the insertion area 30. As can be seen in FIG. 7B, the words "you" and "?" have disappeared because they have left totally the recognition area 28. The word "are" is still displayed as it is still in the process of moving through the boundary between the recognition area 28 and the insertion area 30. As will be apparent further below, masking from view the words that enter totally into the insertion area 30 during the first scrolling S20 maintains free space in the insertion area 30 for the purpose of character insertion by the user.

In another example, the scrolling module M2 may be configured, in the first scrolling S20, to display each word 40 positioned in the recognition area 28 while masking only partially each word 40 exiting entirely from the recognition area 28 and entering into the insertion area 30. Various methods may be contemplated to mask or fade out the words positioned in the insertion area 30.

As explained in the above example, the scrolling module M2 is configured, in the first scrolling S20, to display each word 40 which is positioned at least partially in the recognition area 28 while masking each word 40 that has exited entirely from the recognition area 28 into the insertion area 30. This configuration may be referred to as a "word hiding rule". Other hiding rules may however be implemented in the present disclosure.

For instance, the hiding rule to hide the characters coming from the insertion area 28 into the recognition area 30 may be applied at a character level. In such a configuration, each individual character 34 disappears as soon as it enters into the insertion area 30 from the recognition area 28 (no need in this case to wait for a word boundary). This hiding rule, which may be referred to as a "character hiding rule", enables the convenient insertion of a character into a word while the "word hiding rule" enables the convenient insertion of a character between complete words. The second scrolling S10 described further below in connection with FIG. 7D may be carried out in accordance with the implemented hiding rule.

Figure 7C:
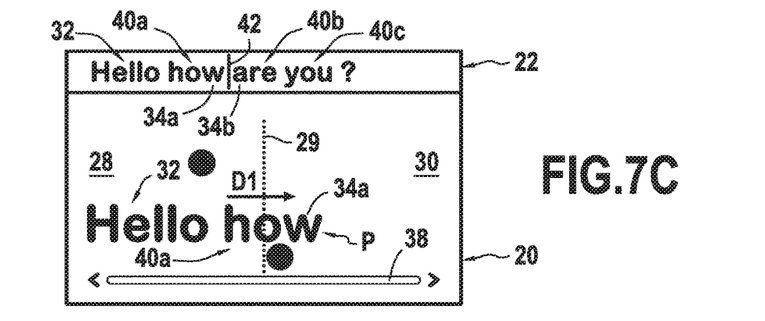
FIG. 7C illustrates another example of the user interface of a computing device, including a content display area that receives user input, according to a particular embodiment of the present disclosure.

As illustrated in FIG. 7C, scrolling (S20) continues in direction D1 so as to select a position P within the string 32 between two consecutive characters at which at least one character is to be inserted. Various techniques may be used to define the insertion position during the first scrolling S20.

In the present example, the scrolling module M2 is configured such that, during the first scrolling S20, the position P selected within the string 32 of characters 34 is a position immediately following the last word 40*a* ("how" in this case) of the string 32 displayed at least partially in the recognition area 28 in the vicinity of the insertion marker 29. In another example where the character hiding rule is implemented, the selected position P is a position immediately following the last character 34 of the string 32 displayed in the recognition area 28 in the vicinity of the insertion marker 29.

In the present example, scrolling S20 is terminated in the state depicted in FIG. 7C so as to select, as position P, the position between the first character "w" (denoted 34*a*) at the end of the word "how" (denoted 40*a*) and the second character "a" (denoted 34*b*) at the beginning of the word "are" (denoted 40*b*). In this example of FIG. 7*c*, the cursor 42 in the content field 22 is positioned at this same position P within the string 42 to facilitate visualisation by the user of the insertion position P where characters may be inserted.

Easy selection of the position P can be made in this particular example as termination of scrolling S20 automatically causes selection of the position P. No further interaction by the user is necessary to allow selection of the insertion position P.

As indicated earlier, the insertion marker 29 may be used to assist the user in selecting the appropriate position P while scrolling (S20) the string 32 across the recognition area 28. The selected position P can be determined based on the relative position of insertion marker 29 within the string 32 of characters 34. In the present example, the insertion marker 29 forms a line (a dashed line in this case) as the boundary between the recognition area 28 and the insertion area 30. In the present example, the insertion marker 29 is static within the input area 20 and it is the string 32 which is scrolled during first scrolling S2 to control the position of the insertion marker 29 relative to the string 32, or the position of the string 32 relative to the insertion marker 29.

In the example of FIGS. 7A-7C, the first scrolling S20 is performed in direction D1. In another example, the first scrolling may involve scrolling in direction D2, or alternatively in directions D1 and D2 while the user searches for the appropriate position P at which character(s) are desired to be inserted. In the case where the word hiding rule (or respectively, the character hiding rule) as explained earlier is implemented, each word (or respectively, character) appears in the insertion area 28 once it has entered completely into the insertion area 28 from the recognition area 30.

Figure 7D:
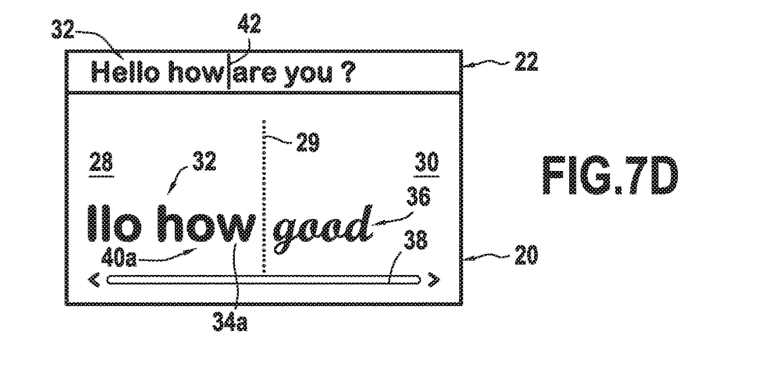
FIG. 7D illustrates another example of the user interface of a computing device, including a content display area that receives user input, according to a particular embodiment of the present disclosure.

As illustrated in FIG. 7D, once the appropriate or desired position P has been selected, the user inputs manually at least one stroke 36 corresponding to the one or more characters (the four characters of the word "good" in this case) that he/she wishes to insert at position P within the string 32 of characters 34. Accordingly, in S22, the detection module M4, in this example, detects at least one input stroke 36 entered manually in the insertion area 30.

Stroke detection S22 may be performed in any suitable manner by the device 2.

Figure 7E:
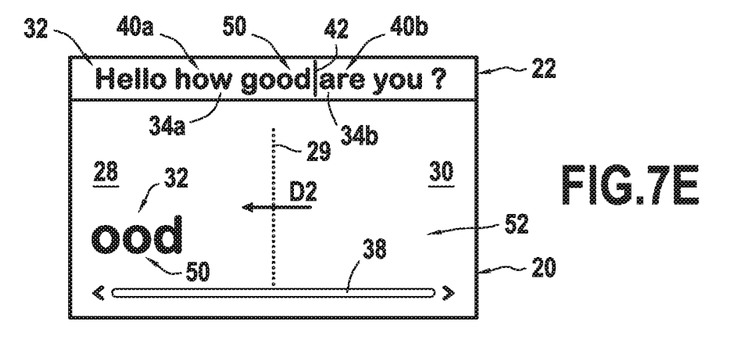
FIG. 7E illustrates another example of the user interface of a computing device, including a content display area that receives user input, according to a particular embodiment of the present disclosure.

The recognition module M6 then performs (S24) handwriting recognition to convert the detected strokes 36 into at least one recognised character 50, as shown in the example of FIG. 7E. In the present example, the recognition module M6 recognizes the characters 50 forming the word "good". Handwriting recognition may be performed in any suitable manner by the device 2 as described earlier.

At this stage, different implementations of the present disclosure may be contemplated. In the present example, the detected input strokes 36 are displayed (526) while the handwriting recognition S24 is in progress. This allows a temporary display of the handwritten text 36 as digital ink in the insertion area 30 (as shown in FIG. 7D).

In S28, the insertion module M8 detects whether or not the handwriting recognition S24 is completed. This detection may occur as a result of the recognition module M6 communicating directly or indirectly to the insertion module M8 that recognition is complete or upon output of the recognition result by the handwriting recognizer, for example.

Once it is detected (S28) that the handwriting recognition S24 is completed, the insertion module M8 inserts (S30) the at least one recognised character(s) 50 at the position P within the string 32 of characters 34 and the scrolling module M2 scrolls (S32) the string 32 in the direction D2 in the recognition area 28 so as to display, in the recognition area 28, at least part of the recognised characters 50 ("good" in this example) where they are inserted into the string 32 of characters 34. As can be seen for instance in FIG. 7E, the string 32 is scrolled back to the left so that the characters "ood" of the inserted word "good" is apparent in the recognition area 28. Scrolling S32 in direction D2 enables insertion space 52 to be accommodated within the insertion area 30 so as to allow additional stroke input within the insertion area 30.

In the present example, each recognised character 50 positioned in the recognition area 28 as a result of second scrolling S32 is displayed as text or typeset ink, as described earlier.

In the present example, the inserted characters 50 are also inserted at the position P within the string 32 of characters in the content field 22.

Figure 7F:
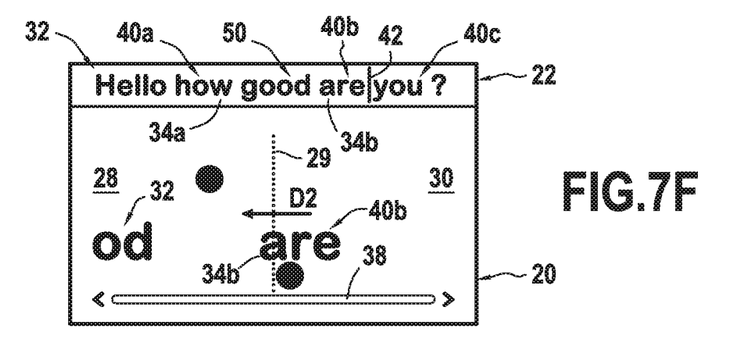
FIG. 7F illustrates another example of the user interface of a computing device, including a content display area that receives user input, according to a particular embodiment of the present disclosure.
Figure 7G:
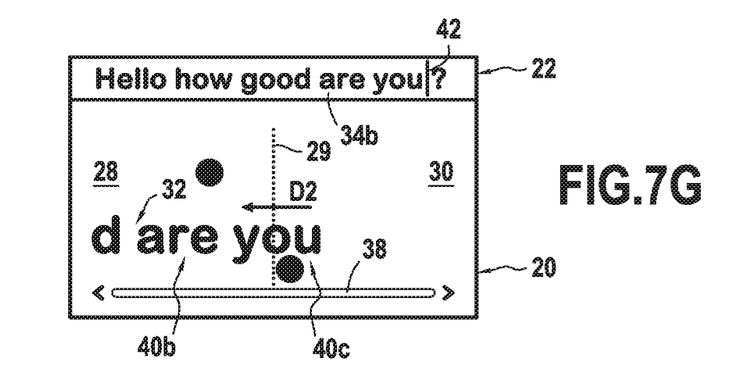
FIG. 7G illustrates another example of the user interface of a computing device, including a content display area that receives user input, according to a particular embodiment of the present disclosure.

As illustrated in FIGS. 7F and 7G, after the second scrolling S32, a third scrolling (S34) in the same direction as the second scrolling (i.e., direction D2 in this case) may be performed to cause display, in the recognition area 28, of at least the second character 34b (i.e., the first character "a" of the word 40b "are") immediately following the inserted characters 50 within the string 32 of characters 34. The characters following the inserted word "good" may appear at the same rate as the scrolling. Cursor 42 position in the content field 22 may also be continuously updated taking into account the latest visible character or word. The third scrolling S34 allows scrolling back of the string 32 in the recognition area 28 to display therein the characters or words following the inserted characters 50. The user is thus able to see or visualize at least part of the sentence 32 in which the word "good" has been inserted. The user may select another position P to insert additional characters in the same manner as explained above with respect to S20-S32.

Figure 8:
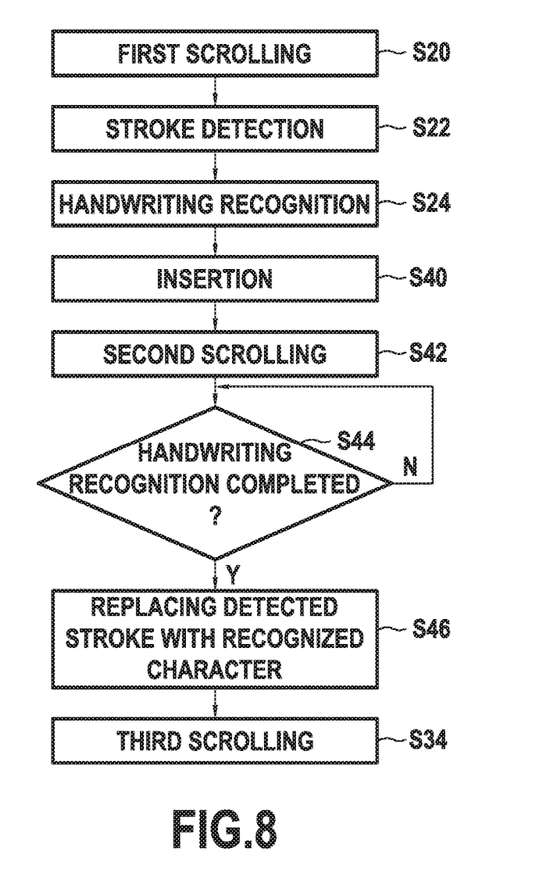
FIG. 8 shows a character input method according to a particular embodiment of the present disclosure.
Figure 9A:
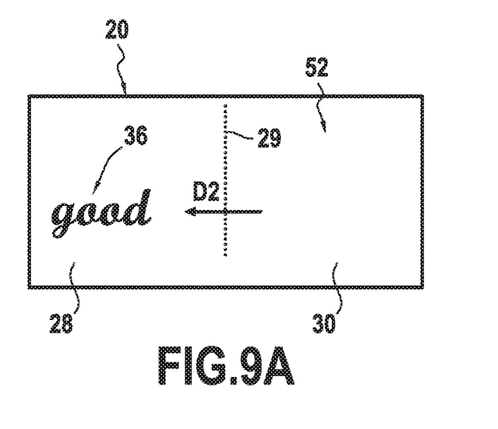
FIG. 9A shows a user interface of a computing device, including a content display area that receives user input, according to a particular embodiment of the present disclosure.
Figure 9B:
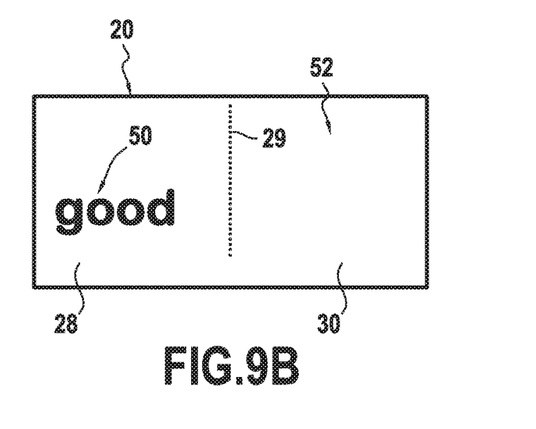
FIG. 9B shows another example of the user interface of a computing device, including a content display area that receives user input, according to a particular embodiment of the present disclosure.

A character input method as illustrated in FIG. 5 is now described in more detail in another particular embodiment with reference to FIGS. 8 and 9A-9B. More specifically, the device 2 implements this method by executing the computer program PG stored in the memory 6.

It is again assumed in this example that the user has previously input into the device 2 the string 32 of characters 34 "Hello how are you?", or the device 2 has this string 32 otherwise stored in the memory 6, for example, and that S20, S22 and S24 have been carried out as already described in connection with FIG. 6.

As shown in FIG. 9A, while handwriting recognition S24 is being performed, the scrolling module M2 inserts (S40), at the position P within the string 32 of characters 34, the detected at least one input stroke 36. The scrolling module M2 then scrolls (S42), as a second scrolling, the string 32 in direction D2 into the recognition area 28 so as to display, while the handwriting recognition is in progress, at least part of the inserted at least one input stroke 36 in the recognition area 28. This advantageously allows the user to visualize in the recognition area 28 what he/she has just input while making additional space or room for further input in the insertion area 30.

In S44 the insertion module M8 detects whether or not the handwriting recognition S24 is completed, as discussed earlier.

As shown in FIG. 9B, once the handwriting recognition S24 is completed, the scrolling module M2 replaces (S46) the inserted input stroke(s) 36 being displayed in the recognition area 28 with the corresponding recognised character(s) 50.

A third scrolling S34 may then be performed in the same manner as already described in connection with FIG. 6.

The system and method of the present disclosure allows efficient and user-friendly insertion of additional characters into an existing string of characters at an appropriate position therebefore, therein or thereafter. Accordingly, input of additional characters in a natural and relatively quick manner is provided.

In particular, easy selection of the position at which insertion is to be carried out can be achieved thanks to the present teachings. The user does not need to perform complex or hard to remember gestures and may easily remember the procedure for performing character insertion according to the system and method of the present disclosure. The user may insert additional characters directly in the input area destined for handwriting input. In particular, the present system and method obviates the need for inserting additional characters using an input field separate from the input area of the digital device.

It should be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved.

Furthermore, aspects of the present principles can take the form of a computer readable storage medium. Any combination of one or more computer readable storage medium(s) may be utilized. A computer readable storage medium can take the form of a computer readable program product embodied in one or more computer readable medium(s) and having computer readable program code or instructions embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing.

This disclosure having been described in particular embodiments, it is clear that it is susceptible to numerous modifications and embodiments within the ability of those skilled in the art and without the exercise of the inventive faculty. Accordingly, the scope of the invention is defined by the scope of the following claims.

What is claimed is:

1. A character input method performed by a computing device comprising:
a processor; and
a touchscreen display device that is operably connected to the processor, the touchscreen display device comprising an interactive user interface including a handwriting recognition area and a digital ink insertion area that are horizontally adjacent to each other, the method comprising:
firstly scrolling, by the processor, a string of characters displayed at least in the handwriting recognition area of the touchscreen display device to select a position between a first character and a second character consecutive to the first character within the displayed string of characters, wherein said firstly scrolling comprises scrolling in a first direction by moving each character of the string of characters displayed in the handwriting recognition area within the handwriting recognition area until entering into the digital ink insertion area;

detecting, by the touchscreen display device, at least one digital ink input stroke entered manually in the digital ink insertion area;

converting, by the processor and using handwriting recognition, the at least one detected digital ink input stroke into at least one recognised character;

inserting, at the selected position within the displayed string of characters, the at least one recognised character; and secondly scrolling, automatically by the processor, the displayed string of characters in the handwriting recognition area by moving said displayed string of characters in a second direction opposite said first direction, to display, in the handwriting recognition area that is horizontally adjacent to the digital ink insertion area, at least part of the at least one recognised character that was inserted into the displayed string of characters in the digital ink insertion area, inserting, at the position within the displayed string of characters, the at least one digital ink input stroke that was detected, and replacing the at least one digital ink input stoke that was inserted and is displayed in the handwriting recognition area with the at least one recognized character after the handwriting recognition is completed, wherein the at least one inserted character is displayed as typeset text in the handwriting recognition area.

2. The method of claim 1, wherein, in the firstly scrolling, an insertion marker displayed on the touchscreen display device defines the position within the displayed string of characters.

3. The method of claim 2, wherein the insertion marker is statically positioned at a boundary between the handwriting recognition area and the digital ink insertion area during the firstly scrolling.

4. The method of claim 1, wherein the displayed string of characters comprises a plurality of words, each of the plurality of words having at least one character, the method further comprising:
during the firstly scrolling, displaying each word positioned in the handwriting recognition area while masking, at least partially, each word entering entirely into the digital ink insertion area from being fully displayed in the handwriting recognition area.

5. The method of claim 1, wherein the displayed string of characters comprises a plurality of words, each of the plurality of words having at least one character, and
wherein, in the firstly scrolling, the position selected within the displayed string of characters is a position immediately following the last word of the plurality of words that is displayed at least partially in the handwriting recognition area.

6. The method of claim 1, wherein the secondly scrolling is performed automatically after the detecting of the at least one digital ink input stroke.

7. The method of claim 6, wherein the secondly scrolling is triggered automatically upon detection that the handwriting recognition is completed.

8. The method of claim 1, further comprising:
displaying, in the digital ink insertion area and while the converting using handwriting recognition is being performed, the at least one digital ink input stroke that was detected.

9. The method of claim 1, wherein the secondly scrolling comprises:
scrolling the displayed string of characters in the handwriting recognition area to display, while the converting using handwriting recognition is being performed in the handwriting recognition area, at least part of the at least one digital ink input stroke that was inserted.

10. The method according to claim 1, comprising:
after the secondly scrolling, thirdly scrolling in a same direction as the secondly scrolling to cause display, in the handwriting recognition area, of a second character immediately following the at least one recognised character that was inserted within the displayed string of characters.

11. A non-transitory computer readable medium having a computer readable program code embodied therein, the computer readable program code being adapted to be executed by a processor to implement a character input method in a computing device comprising a touchscreen display device, the touchscreen display device comprising an interactive user interface including a handwriting recognition area and a digital ink insertion area that are horizontally adjacent to each other, the character input method comprising:
firstly scrolling, by the processor, a string of characters displayed at least in the handwriting recognition area of the touchscreen display device to select a position between a first character and a second character consecutive to the first character within the displayed string of characters, wherein said firstly scrolling comprises scrolling in a first direction by moving each character of the string of characters displayed in the handwriting recognition area within the handwriting recognition area until entering into the digital ink insertion area;

detecting, by the touchscreen display device, at least one digital ink input stroke entered manually in the digital ink insertion area;

converting, by the processor and using handwriting recognition, the at least one detected digital ink input stroke into at least one recognised character;

inserting, at the selected position within the displayed string of characters, the at least one recognised character; and secondly scrolling, automatically by the processor, the displayed string of characters in the handwriting recognition area by moving said displayed string of characters in a second direction opposite said first direction, to display, in the handwriting recognition area that is horizontally adjacent to the digital ink insertion area, at least part of the at least one recognised character that was inserted into the displayed string of characters in the digital ink insertion area, inserting, at the position within the displayed string of characters, the at least one digital ink input stroke that was detected, and replacing the at least one digital ink input stoke that was inserted and is displayed in the handwriting recognition area with the at least one recognized character after the handwriting recognition is completed, wherein the at least one inserted character is displayed as typeset text in the handwriting recognition area.

12. A system for inputting characters, the system comprising:

a touchscreen display device comprising an interactive user interface including a handwriting recognition area and a digital ink insertion area for accepting character input, wherein the handwriting recognition area and the digital ink insertion area are horizontally adjacent to each other;

a non-transitory computer readable medium including instructions; and a processor, operably connected to the touchscreen and the non-transitory computer readable medium, that executes the instructions to perform operations comprising:

firstly scrolling, by the processor, a string of characters displayed at least in the handwriting recognition area of the touchscreen display device to select a position between a first character and a second character consecutive to the first character within the displayed string of characters, wherein said firstly scrolling comprises scrolling in a first direction by moving each character of the string of characters displayed in the handwriting recognition area within the handwriting recognition area until entering into the digital ink insertion area;

detecting, by the touchscreen display device, at least one digital ink input stroke entered manually in the digital ink insertion area;

converting, by the processor and using handwriting recognition, the at least one detected digital ink input stroke into at least one recognised character;

inserting, at the selected position within the displayed string of characters, the at least one recognised character; and secondly scrolling, automatically by the processor, the displayed string of characters in the handwriting recognition area by moving said displayed string of characters in a second direction opposite said first direction, to display, in the handwriting recognition area that is horizontally adjacent to the digital ink insertion area, at least part of the at least one recognised character that was inserted into the displayed string of characters in the digital ink insertion area, inserting, at the position within the displayed string of characters, the at least one digital ink input stroke that was detected, and replacing the at least one digital ink input stoke that was inserted and is displayed in the handwriting recognition area with the at least one recognized character after the handwriting recognition is completed, wherein the at least one inserted character is displayed as typeset text in the handwriting recognition area.

* * * * *